US008682616B2

(12) United States Patent
Lacaille

(10) Patent No.: US 8,682,616 B2
(45) Date of Patent: Mar. 25, 2014

(54) IDENTIFYING FAILURES IN AN AEROENGINE

(75) Inventor: Jérôme Lacaille, Rosny Sous Bois (FR)

(73) Assignee: SNECMA, Paris (FR)

( * ) Notice: Subject to any disclaimer, the term of this patent is extended or adjusted under 35 U.S.C. 154(b) by 332 days.

(21) Appl. No.: 13/139,774

(22) PCT Filed: Dec. 14, 2009

(86) PCT No.: PCT/FR2009/052511
§ 371 (c)(1),
(2), (4) Date: Aug. 29, 2011

(87) PCT Pub. No.: WO2010/076469
PCT Pub. Date: Jul. 8, 2010

(65) Prior Publication Data
US 2011/0307220 A1 Dec. 15, 2011

(30) Foreign Application Priority Data
Dec. 15, 2008 (FR) ...................................... 08 58609

(51) Int. Cl.
*G06F 15/18* (2006.01)
(52) U.S. Cl.
USPC ............... 702/185; 702/56; 702/85; 702/116; 702/193; 700/100; 700/114; 60/773; 60/39.281; 703/2; 73/489; 73/1.84; 73/112.01; 73/1.37
(58) Field of Classification Search
USPC ............. 702/56, 85, 116, 185, 193, 113, 121; 700/100, 114, 30.9; 324/537; 60/773; 60/39.281, 39.091, 204, 223; 703/2; 73/489, 1.84, 112.01, 1.37
See application file for complete search history.

(56) References Cited

U.S. PATENT DOCUMENTS 4,718,229 A * 1/1988 Riley .......................... 60/39.281
6,353,790 B1 * 3/2002 Tsuzuki ........................ 701/100
(Continued)

FOREIGN PATENT DOCUMENTS

| DE | 10 2007 010 978 | 9/2008 |
| JP | 2009-523270 A | 6/2009 |
| WO | 2007 131545 | 11/2007 |

OTHER PUBLICATIONS

Detroja, K. P. et al., "A Possibilistic Clustering Approach to Novel Fault Detection and Isolation", Journal of Process Control, vol. 16, No. 10, pp. 1055-1073, XP-024963587, (Dec. 1, 2006).

(Continued)

*Primary Examiner* — Carol S Tsai
(74) *Attorney, Agent, or Firm* — Oblon, Spivak, McClelland, Maier & Neustadt, L.L.P.

(57) ABSTRACT

A method and a system for identifying failures in an aeroengine. The system includes: a mechanism defining a set of standardized indicators representative of operation of the aeroengine; a mechanism constructing an anomaly vector representative of a behavior of the engine as a function of the set of standardized indicators; a mechanism selecting in an event of an anomaly being revealed by the anomaly vector a subset of reference vectors having directions belonging to a determined neighborhood of a direction of the anomaly vector, the subset of reference vectors being selected from a set of reference vectors associated with failures of the aeroengine and determined using criteria established by experts; and a mechanism identifying failures associated with the subset of reference vectors.

15 Claims, 2 Drawing Sheets

(56) References Cited

U.S. PATENT DOCUMENTS

| | | | |
|---|---|---|---|
| 6,393,355 B1* | 5/2002 | Muramatsu | 701/100 |
| 6,480,780 B1* | 11/2002 | Schwamm | 701/100 |
| 6,494,046 B1* | 12/2002 | Hayess | 60/779 |
| 6,928,370 B2* | 8/2005 | Anuzis et al. | 702/56 |
| 6,999,884 B2* | 2/2006 | Astley et al. | 702/56 |
| 7,191,073 B2* | 3/2007 | Astley et al. | 702/56 |
| 7,237,382 B2* | 7/2007 | Muramatsu et al. | 60/773 |
| 7,246,024 B2* | 7/2007 | Muramatsu et al. | 702/116 |
| 7,591,183 B2* | 9/2009 | King | 73/660 |
| 7,640,802 B2* | 1/2010 | King et al. | 73/489 |
| 7,840,336 B2* | 11/2010 | Muramatsu et al. | 701/114 |
| 7,861,578 B2* | 1/2011 | Adibhatla et al. | 73/112.01 |
| 2002/0040278 A1* | 4/2002 | Anuzis et al. | 702/56 |
| 2004/0030417 A1* | 2/2004 | Gribble et al. | 700/29 |
| 2005/0119840 A1* | 6/2005 | Astley et al. | 702/56 |
| 2005/0217273 A1* | 10/2005 | Muramatsu et al. | 60/773 |
| 2005/0217274 A1* | 10/2005 | Muramatsu et al. | 60/773 |
| 2005/0222822 A1* | 10/2005 | Muramatsu et al. | 702/193 |
| 2006/0265153 A1* | 11/2006 | Astley et al. | 702/56 |
| 2007/0006636 A1* | 1/2007 | King et al. | 73/1.84 |
| 2007/0055435 A1* | 3/2007 | Muramatsu et al. | 701/100 |
| 2007/0056376 A1* | 3/2007 | King | 73/660 |
| 2009/0024555 A1 | 1/2009 | Rieck et al. | |

OTHER PUBLICATIONS

Qin, S. J. et al., "Statistical Process Monitoring: Basics and Beyond", Journal of Chemometrics, vol. 17, pp. 480-502, XP-007909246, (Jan. 1, 2003).

International Search Report Issued Mar. 17, 2010 in PCT/FR09/052511 filed Dec. 14, 2009.

Office Action mailed Oct. 22, 2013, in Japanese Appln. No. 2011-540182 with English Translation, pp. 1-5.

* cited by examiner

IDENTIFYING FAILURES IN AN AEROENGINE

FIELD OF THE INVENTION

The present invention relates to the field of monitoring an aeroengine. In particular, the invention relates to identifying failures and to detecting faulty components in an aeroengine.

In numerous industries, such as the aviation and space industries, it is important to be able to identify failures of an aeroengine from measurements that describe the instantaneous state of the engine so as to deduce which physical component is faulty, if any. Nevertheless, such time-series measurements are expressed in a variety of different physical units and they may vary from flight to flight in arbitrary manner, thereby complicating any analysis and processing of such measurements.

So-called "scoring" tools exist that seek to substitute time-series measurements that may be expressed in various different units, with quality scores. Such tools are based on likelihood calculations leading to quality control systems. Nevertheless, scoring tools are difficult to apply in a multivariate field such as monitoring an aeroengine. Furthermore, those scores correspond to relative values that are not easily transformed into a real environment that is understandable to an engine expert.

There are also classifying or labeling tools that in general accompany solutions for providing statistical control over industrial methods. Nevertheless, such classification tools need to be calibrated on fault databases that are large in size and very difficult to obtain, very expensive, and that require a large amount of calculation time. In particular, such classification tools are extremely difficult to apply in the field of aeroengines. This is because, fortunately, there are very few genuine breakdowns of aeroengines, and it is therefore very difficult to construct a large database of failures.

OBJECT AND SUMMARY OF THE INVENTION

The present invention provides a method of identifying failures in an aeroengine, the method comprising the following steps:

defining a set of standardized indicators that are representative of the operation of said aeroengine;

constructing an anomaly vector representative of a behavior of said engine as a function of said set of standardized indicators;

in the event of an abnormality being revealed by said anomaly vector, selecting a subset of reference vectors having directions belonging to a determined neighborhood of the direction of said anomaly vector, said subset of reference vectors being selected from a set of reference vectors that are associated with failures of said aeroengine and that are determined using criteria established by experts; and identifying the failures associated with said subset of reference vectors.

This method makes it easy to interpret anomaly vectors and reference vectors that correspond to signatures that are represented in a physical frame of reference that is understandable for engine experts. Furthermore, it is possible to rely on knowledge collected from experts rather than on a database of failures or faults that would be very expensive and difficult to construct. This makes it possible to identify failures in a manner that is understandable and fast, and at lower cost.

In an aspect of the present invention, selecting said subset of reference vectors comprises the following steps:

calculating geodesic distances between the direction of said anomaly vector and the directions of said reference vectors on a sphere in a space of dimension equal to the number of indicators of said set of standardized indicators minus the number of linear relationships between said indicators;

comparing said geodesic distances in pairs;

classifying the reference vectors in increasing order of their geodesic distances relative to said anomaly vector; and forming said subset of reference vectors from first reference vectors having a classification order less than a determined rank.

This makes it easy to select the failure signatures that are the closest, even in a space of large dimension, by limiting the dimension of the problem to a subspace that is generated by the selected reference vectors.

According to a feature of the present invention, said sphere is of radius 1.

According to an another aspect of the present invention, the identification of failures comprises the following steps:

defining for each reference vector an a priori probability of occurrence using criteria established by experts; and calculating for each reference vector an a posteriori probability of occurrence as a function of said a priori probability of occurrence and of said geodesic distances.

This makes it easy to identify the most probable failures.

According to a feature of the present invention, said set of standardized indicators $\tilde{\tilde{y}}_1, \ldots \tilde{\tilde{y}}_n$ comprises indicators $\tilde{y}_1, \ldots \tilde{y}_m$ identified using criteria established by experts.

Thus, an engine expert is capable at all times of interacting with and interpreting the anomaly signatures.

According to another feature of the present invention, said set of standardized indicators $\tilde{\tilde{y}}_1, \ldots \tilde{\tilde{y}}_n$ further comprises dynamic indicators that are constructed as a function of the indicators at present and past instants $\tilde{\tilde{y}}(t) = f(\tilde{y}(s); s \le t)$ representative of the behavior over time of said aeroengine.

It is thus possible to pick up the dynamic behavior of the aeroengine and the way in which it varies.

Advantageously, said anomaly vector is constructed using the following steps:

forming an indicator vector $\tilde{\tilde{y}}$ from said set of indicators; and constructing said anomaly vector z by renormalizing said indicator vector $\tilde{\tilde{y}}$ using the following formula:

$$z = \Sigma^{-1/2}(\tilde{\tilde{y}} - \mu),$$

where $\mu$ is the mean of the indicator vectors and $\Sigma$ is a covariance matrix from which a pseudo-inverse $\Sigma^{-1}$ is calculated and also a root $\Sigma^{-1/2}$ by decomposition into singular values.

This makes interpretation easier and facilitates calculation performed on the anomaly vectors.

In addition, the method includes the following steps:

calculating the norm of said anomaly vector using a Mahalanobis distance:

$$d^2 = \|z\|^2 = (\tilde{\tilde{y}} - \mu)^T \Sigma^{-1}(\tilde{\tilde{y}} - \mu); \text{ and}$$

detecting an abnormality of said aeroengine depending on a trigger threshold defined as a function of the statistical distribution of said norm of the anomaly vector.

Thus, the norm of the anomaly vector corresponds to an overall score representative of an abnormal behavior that is easy to detect in a known statistical distribution that may be approximated by a $\chi^2$.

Advantageously, said set of reference vectors is constructed in accordance with caricatural behaviors of the indicators in the event of an anomaly.

Thus, the reference vectors may easily be constructed while keeping meaning that is understandable for experts.

The method of the invention also includes the following steps:
- establishing a decision grid in application of criteria established by experts;
- using Bayesian rules to deduce per component failure probabilities from said a posteriori probabilities of occurrence and from said decision grid; and
- detecting faulty physical components that are responsible for said failures on the basis of said per component failure probabilities.

This facilitates finding the equipment that is faulty, thus enabling maintenance of the aeroengine to be performed quickly and effectively.

Said decision grid may be formed by a matrix of conditional probabilities that a component is faulty, knowing that a failure has been observed and from a series of coefficients corresponding to a priori probabilities of each component failing.

Thus, the decision grid may easily be constructed from the knowledge of experts.

Advantageously, said decision grid is corroborated by machine learning.

This enables a decision grid to be constructed that is more accurate and more robust.

The invention also provides a system for identifying failures in an aeroengine, the system comprising:
- means for defining a set of standardized indicators representative of the operation of said aeroengine;
- means for constructing an anomaly vector representative of a behavior of said engine as a function of said set of standardized indicators;
- means for selecting in the event of an anomaly being revealed by said anomaly vector a subset of reference vectors having directions belonging to a determined neighborhood of the direction of said anomaly vector, said subset of reference vectors being selected from a set of reference vectors associated with failures of said aeroengine and determined using criteria established by experts; and
- means for identifying failures associated with said subset of reference vectors.

The invention also provides a computer program including instructions for implementing the method of identifying failures using the above steps when executed by processor means.

BRIEF DESCRIPTION OF THE DRAWINGS

Other features and advantages of the device and the method of the invention appear better on reading the following description given by way of non-limiting indication with reference to the accompanying drawings, in which.

DETAILED DESCRIPTION OF EMBODIMENTS

Figure 1:
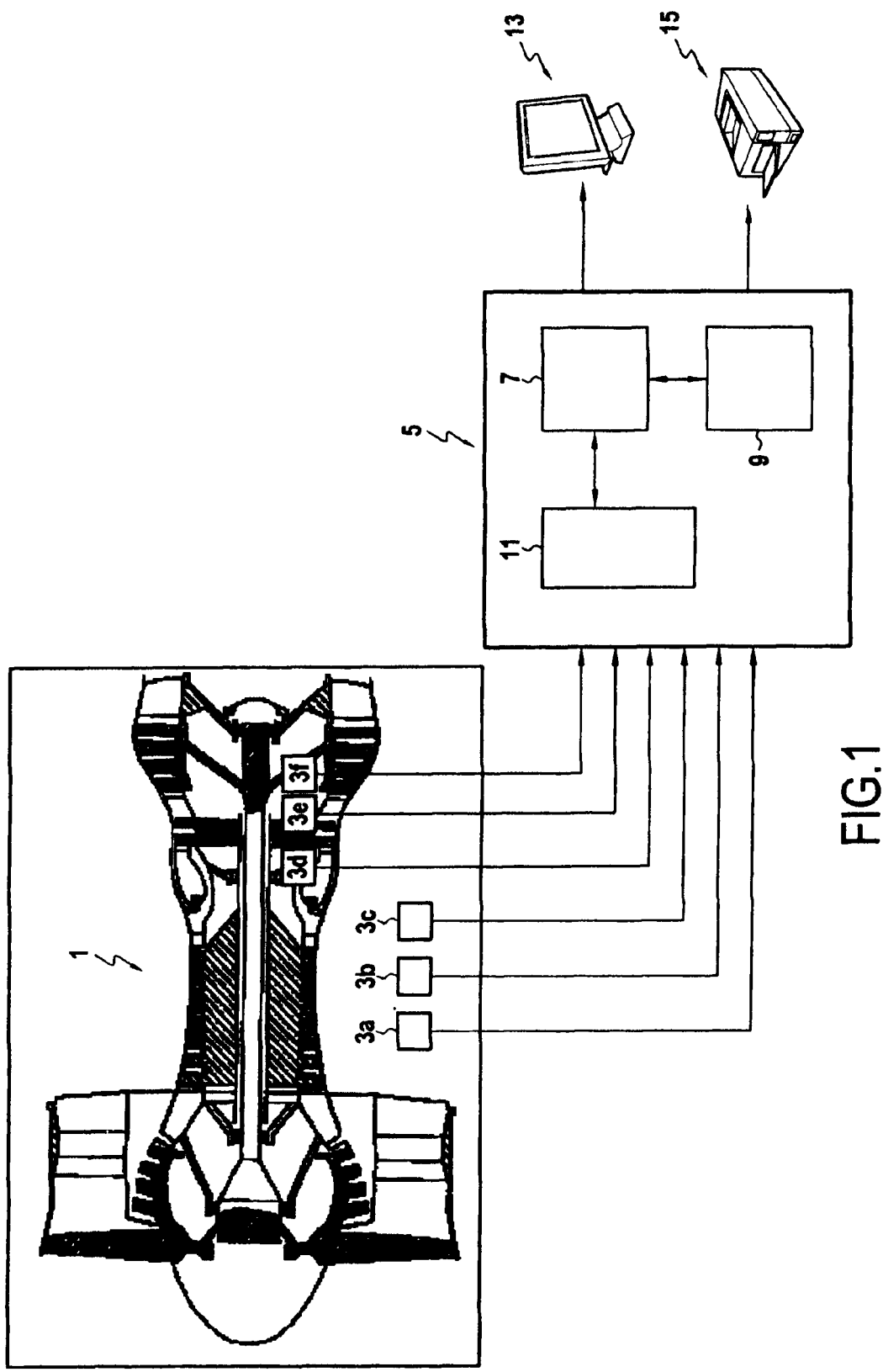
FIG. 1 shows the hardware means implemented in the system or method of the invention for identifying failures in an aeroengine.

FIG. 1 shows the hardware means implemented in the system or method of the invention for identifying failures in an aeroengine 1.

The system comprises a plurality of sensors 3a-3f for measuring time-series data relating to the engine 1 and its environment. The system also includes processor means 5 for processing information such as a calculator or computer suitable for being used to execute a computer program designed to implement the method of the invention. The processor means 5 comprise the hardware means that are conventionally found in a computer. More particularly, these processor means 5 comprise a central unit 7 that executes the instruction sequences of the program of the method of the invention, a central memory 9 that stores the data and programs being executed, storage means or media 11 for storing digital conserving the data, input peripherals (sensors 3a-3f, keyboard, mouse, . . . ) and output peripherals (screen 13, printer 15, . . . ) for delivering the result of identifying failures.

Figure 2:
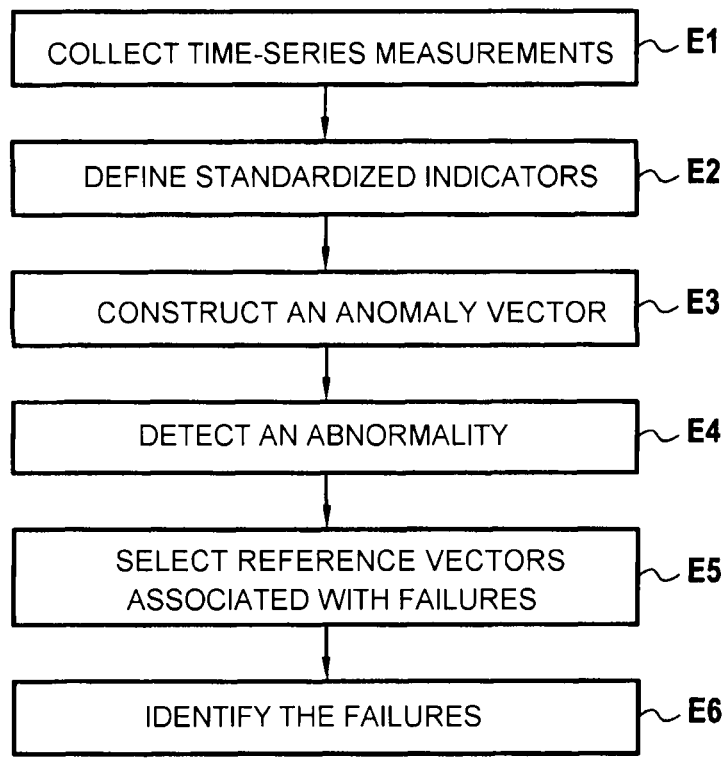
FIG. 2 is a flow chart showing the main steps of identifying failures of the FIG. 1 aeroengine.

FIG. 2 shows the main steps implemented in accordance with the invention by the processor means 5 to identify failures in the aeroengine 1.

In a step E1, the processor means 5 are configured to act over time to collect and digitize time-series measurements that are acquired by the sensors 3a-3f from the aeroengine 1 and its environment.

In a step E2, the processor means 5 are configured to define standardized indicators.

On the basis of time-series measurements, it is possible to calculate indicators $y_1, \ldots, y_j, \ldots, y_m$ that are specific to elements of the engine 1. For example, one indicator may correspond to the delay needed for an engine shaft to reach maximum acceleration after each start of the engine, another indicator may be the temperature gradient of the exhaust gas from the engine, etc.

It should be observed that the indicators may be specific to physical elements, indicating a particular element of the engine 1 or to logical elements, indicating a specific task for an entire set of elements of the engine 1.

These indicators $y_1, \ldots, y_j, \ldots, y_m$ may be calculated using criteria provided by experts, e.g. on the basis of a document that is drawn up by engine experts and known as failure modes, effects, and criticality analysis (FMECA). That document lists the failures, the pieces of equipment involved, the causes, the consequences, and also the indicators that are calculated from the above measurements that enable a phenomenon to be identified, each of them being associated with a description of the effects that are observed.

Thereafter, the indicators $y_1, \ldots, y_j, \ldots, y_m$ can be standardized, e.g. using a conventional technique of normalization as a function of an average and of a standard deviation that are calculated a priori on the basis of a previously-digitized data series.

In a variant, it is possible to define standardized indicators $\tilde{y}_1, \ldots, \tilde{y}_j, \ldots, \tilde{y}_m$ that are independent of the external context and that also take account of stochastic interdependency relationships between the indicators themselves.

Each measurement collected during a flight is taken in specific external or internal conditions. These conditions, which may have an impact on how indicators should be interpreted, may themselves be measured and recorded as exogenous data. The external conditions may comprise outside temperatures and pressures, the attitude and relative speed of the airplane, where the flight is taking place (over an ocean, a desert, land, etc.), weather conditions (rain, snow, ice, etc.), relative humidity, etc. Internal conditions may relate to specific utilization of the engine (shaft speed, exhaust gas temperature, type of fuel, etc.). As an example of exogenous data, the oil temperature immediately before starting the engine may be considered as context data that distinguishes between two types of start (cold start or hot start).

Thus, from the time-series measurements made by the sensors 3a-3f, it is possible to identify an exogenous data set $X=(x_1, \ldots, x_h)$ representative of the external context acting on the indicators $y_1, \ldots, y_j, \ldots, y_m$. This may be performed using the criteria of experts performing dependency analysis making it possible to list the contextual data that is associated with the indicators.

Thereafter, for each indicator, a regression of observations is constructed on a space that is generated by the other indicators, the context data, expressions obtained from the analysis of experts, and other functions that are implemented, e.g. in the form of a model with nodes. The space that is constructed and onto which the observations are projected is of much greater dimension than the number of initial indicators.

In other words, for each given indicator $Y_j$, a projection space $E^{(j)}=\sigma(Y^{(j)},X)$ is constructed. This projection space is generated by the exogenous data set $X=(x_1, \ldots, x_h)$ and by analytic transformations of a subset of indicators $Y^{(j)}=(y_1, \ldots, y_{j-1}, y_{j+1}, \ldots y_m)$ that comprises all of the initial indicators other than the given indicator $Y_j$. The analytic transformations expressed physical relationships between the indicators and they may be defined by experts. These analytic transformations may also include an identity transformation, and linear or non-linear transformations or functions providing information about correlations between different indicators. Thereafter, for each given indicator $Y_j$, a corresponding estimator $\hat{y}_j$ is calculated by using a regression technique to project the given indicator $Y_j$ onto the projection space $E^{(j)}=\sigma(Y^{(j)},X)$, thereby forming a set of estimators $\hat{Y}=(\hat{y}_1, \ldots, \hat{y}_j, \ldots, \hat{y}_m)$.

Finally, each estimator $\hat{y}_j$ may be normalized as a function of a reference value for the corresponding indicator $Y_j$ and a residue or difference between each given estimator $\hat{y}_j$ and the corresponding indicator $Y_j$ so as to form standardized indicators $\tilde{y}_1, \ldots, \tilde{y}_j, \ldots, \tilde{y}_m$ representative of the operation of the engine 1.

On the basis of these standardized indicators $\tilde{y}_1, \ldots, \tilde{y}_j, \ldots, \tilde{y}_m$ constructed using the above methods, or any other method, the objective is to diagnose an anomaly and then to deduce a specific failure and possibly the physical components concerned.

Nevertheless, prior to diagnosing anomalies, it is possible, in addition to the indicators $\tilde{y}_1, \ldots \tilde{y}_m$ as identified by experts, to add indicators concerning the immediate past (trend, curvature, acceleration, shape, . . . ) so as to pick up also the dynamic behavior of the engine and thus how it is varying.

Successive observation of indicators may provide dynamic information about the indicators. Given that the standardized indicators are suitable for being compared (which is not true of the initial indicators), it is possible for the standardized indicators as identified by experts to be combined in dynamic manner.

Thus, it is possible to define a set of standardized indicators $\tilde{\tilde{y}}_1, \ldots \tilde{\tilde{y}}_n$ that are representative of time-varying behaviors of the aeroengine 1 and that comprise both indicators $\tilde{y}_1, \ldots \tilde{y}_m$ as identified by experts and dynamic indicators constructed as a function of the indicators $\tilde{y}_1, \ldots \tilde{y}_m$ as identified by experts as they are at present and as they have been in the past $\tilde{\tilde{y}}(t)=f(\tilde{y}(s); s \leq t)$.

A step E3 relates to constructing an anomaly signature that is representative of the behavior of the engine 1. More particularly, the processor means 5 are configured to construct an anomaly vector (or anomaly signature) as a function of the set of standardized indicators $\tilde{\tilde{y}}_1, \ldots \tilde{\tilde{y}}_n$.

The construction of the anomaly vector may be performed initially by forming an indicator vector $\tilde{\tilde{y}}$ of dimension n from the set of standardized indicators $\tilde{\tilde{y}}_1, \ldots \tilde{\tilde{y}}_n$. Thereafter, it is possible to construct the standardized anomaly vector z by renormalizing the indicator vector $\tilde{\tilde{y}}$.

It should be observed that for standardized indicators calculated by the residues obtained using a least-squares minimization technique, the indicator vector $\tilde{\tilde{y}}$ may reasonably be normalized with a multivariate Gaussian distribution.

More particularly, the mean μ of the standardized indicator vectors $\tilde{\tilde{y}}_1, \ldots \tilde{\tilde{y}}_n$ is subtracted so that the vector is centered, the covariance matrix Σ is calculated, and then the anomaly vector is formed by rectifying the indicator vector $\tilde{\tilde{y}}$ by the covariance matrix Σ using the following formula:

$$z=\Sigma^{-1/2}(\tilde{\tilde{y}}-\mu)$$

using the root of a pseudo-inverse of Σ calculated by decomposing into singular values $\Sigma=USU^T$ with $U^TU=1$ and $S=\text{diag}(\sigma_1^2, \ldots \sigma_{n-k}^2, 0, \ldots)$. Thus, the standardized anomaly vector z may approximately follow a normal Gaussian distribution on the complement of the core of Σ of dimension $k \geq 0$ as identified by the singular values considered as being approximately zero.

A step E4 is an abnormality test. The processor means 5 are configured to diagnose whether the anomaly signature or vector reveals an anomaly.

Normal signatures are fairly flat, whereas abnormalities are represented by large variations and are easily interpretable.

Thus, an anomaly may be detected by calculating the norm of the anomaly vector, e.g. using the Mahalanobis distance expressed using the following formula:

$$d^2=\|z\|^2=(\tilde{\tilde{y}}-\mu)^T \Sigma^{-1} (\tilde{\tilde{y}}-\mu)$$

where μ is the mean of the standardized indicator vectors $\tilde{\tilde{y}}_1, \ldots \tilde{\tilde{y}}_n$, and Σ is the covariance matrix.

Advantageously, the statistical distribution of the Mahalanobis distance is known and may be approximated by a $\chi^2(n-k)$. Furthermore, the 3σ and 6σ levels (where σ is the standard deviation) relative to the mean value may be obtained directly by analytic calculation. Consequently, it is easy to detect an abnormality of the aeroengine on the basis of a trigger threshold defined as a function of the statistical distribution of the norm of the anomaly vector.

Thus, the norm of the anomaly vector may be considered as a global score representative of abnormal behavior and that is easy to detect.

In the event of an abnormality, it is also possible to visualize the type of failure by performing two-dimensional projection of the anomaly vectors.

At the end of the test in step E4, the method naturally moves on to a following step E5 only in the event of the anomaly vector revealing an abnormality.

Step E5 relates to selecting reference signatures corresponding to listed failures of the aeroengine.

More particularly, in the event of an abnormality being revealed by the anomaly vector, the processor means 5 are configured to select a subset of reference signatures or vectors having directions belonging to a determined neighborhood of the direction of the anomaly vector. The subset of reference vectors is selected from a predetermined set of reference vectors (or signatures) associated with failures of the aeroengine and determined using criteria established by experts.

The set of reference vectors may be constructed in accordance with caricatural behaviors of the indicators in the event of an anomaly.

When devising the FMECA, the experts may list all kinds of possible failures, with each failure being allocated an a priori probability of occurring, and with sufficient elements being provided to define the caricatural behavior of the indicators in the event of anomalies. The caricatural behavior is generally described informally on the lines: "this value is very high", "this other value is increasing very slowly", "that may be small when the last value is high", and so on.

The caricatural behaviors may be converted in known manner in the form of scores leading to a list of known failures being constructed. Furthermore, on the assumption of a context that is standard, this list enables examples of classified failures to be constructed. These examples may be in the form of vectors that are normalized so as to construct a standardized matrix including a standardized reference vector on each row. As a result, the FMECA serves to define reference vectors that describe in caricatural manner the listed failures in a frame of reference that is real and understandable for engine experts. In addition, the FMECA makes it possible to define an a priori probability of occurrence that is associated with each reference vector.

It should be observed that given that the definitions of failures are caricatural, account can be taken only of the directions of the reference vectors. Thus, the subset of reference vectors may be classified or selected by comparing the anomaly vector with the reference vectors on an $(n-k-1)$-sphere in a vector space of dimension $n-k$ equal to the number of indicators in the set of standardized indicators $\tilde{\tilde{y}}_1, \ldots \tilde{\tilde{y}}_n$, minus the number of linear relationships k between these indicators.

This may be performed by calculating geodesic distances between the projection of the anomaly vector and the projections of the reference vectors on the sphere. Calculating distances between vectors becomes meaningless in a space of dimension greater than five.

More particularly, the geodesic distances are calculated between the direction of the anomaly vector and the directions of the reference vectors on the sphere. Thus, the direction of the anomaly vector may be compared with the directions of the reference vectors by calculating geodesic distance on a sphere of radius 1.

The geodesic distance $\theta^2$ between the anomaly vector z and a standardized reference vector t (a standard "template") may be approximated as a normalized scalar product using the following formula:

$$\theta_t^2 \approx 2\left(1 - \frac{t^T \cdot z}{\|t\| \cdot \|z\|}\right)$$

Naturally, it is possible to make no use of the notion of distance as a distribution parameter in a space of high dimension.

Nevertheless, it is possible to compare these geodesic distances in pairs which makes it possible to classify the reference vectors, e.g. in increasing order of their geodesic distances relative to the anomaly vector. It is then possible to form the subset of reference vectors from the first reference vectors of classification order lower than a determined rank. For example, it is possible to select the first three, four, or five reference vectors to form a subset of a few reference vectors that are representative of the more probable failures.

In a step E6, the processor means 5 are configured to identify the failures associated with the previously-selected subset of reference vectors.

More particularly, the geodesic distances are used for identifying the more probable failures. Since it is always possible to select the main reference vectors closest to the anomaly vector, it is possible to limit the probability model on the corresponding subsphere of smaller dimension and to use the geodesic distances to calculate an a posteriori local probability of occurrence. To do this, a model is used of mixed Gaussians on the sphere. The radii of the Gaussians depend on a priori criteria established by experts.

Thus, for each reference vector, it is possible to calculate an a posteriori probability P(f) of a failure f occurring as a function of an a priori probability of each failure f occurring as defined by experts when devising the FMECA and the geodesic distances used for classifying the subset of reference vectors.

The a posteriori probability of occurrence P(f) may be calculated using a probability model having as a parameter a weighting coefficient $\lambda_t$ defined by experts for each reference vector t, using the following formula:

$$\Sigma_t \lambda_t \exp(-\theta_t^2 / 2\sigma_t^2)$$

where $\theta_t$ is the geodesic distance between the anomaly vector z and the reference vector t; and where $\sigma_t^2$ is calculated using the a priori probability of occurrence associated with the reference vector t.

Thus, the norm $d^2$ of the anomaly vector gives the level of abnormality and the geodesic distance $\theta^2$ serves to identify the more probable failures. This is performed by relying on knowledge collected from experts, and not by relying on a failure database.

Figure 3:
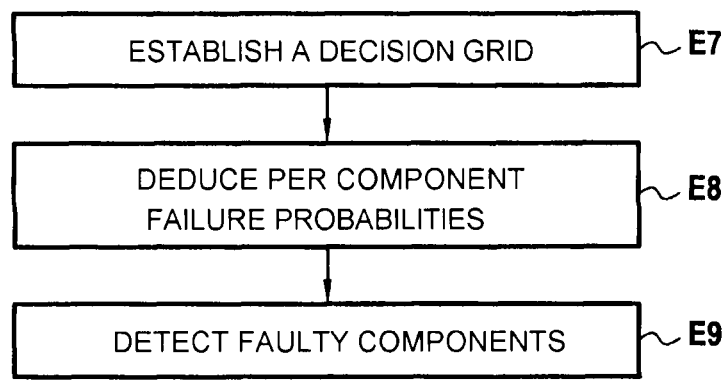
FIG. 3 is a flow chart showing the main steps of detecting faulty components in the FIG. 1 aeroengine.

FIG. 3 shows the main steps implemented by the processor means 5 for detecting faulty components in the aeroengine 1.

After identifying failures by calculating the probability of occurrence for each of them, it is possible to use the probability to detect faulty components. To do this, use is made of a decision grid defined by experts and giving for each physical component under analysis a probability of being faulty when a precise failure is observed.

Thus, in a step E7, the processor means 5 are configured to establish a decision grid on the basis of criteria established by experts. The decision grid may be formed by a matrix $Q=(q_{f,c})$ of conditional probabilities $q_{f,c}=P(c/f)$ that a component c is faulty, given that a failure f has been observed and a series of coefficients corresponding to a priori probabilities of failures of each component c. The matrix $Q=(q_{f,c})$ is a symmetrical positive matrix.

Furthermore, it may be observed that the decision grid may be corroborated by launching machine learning. The main role of such learning is merely to verify the information provided by the experts, thus avoiding any need to construct a database.

In a step E8, the processor means 5 are configured to use Bayesian rules to deduce the per component failure probabilities P(c) for each component c on the basis of the a posteriori probabilities of occurrence P(f) and of the decision grid $Q=(q_{f,c})$.

Thus, for each component c, it is possible to estimate a probability of failure P(c) that is given by the following formula:

$$P(c) = [\beta_c \Sigma_f (2q_{f,c} - 1) P(f)]_0^1$$

where $\beta_c$ is a normalization coefficient that corresponds to an a priori occurrence of the faulty component. Furthermore, the result of the formula is truncated between 0 and 1.

Finally, in a step E9, the processor means 5 are configured to detect the faulty physical components that are responsible for the failures by using the per component failure probabilities calculated in the preceding step.

It should be observed that when an anomaly is detected, step E6 of calculating a posteriori probabilities P(f) of failures occurring makes it easy to represent the probability of each failure diagrammatically on a table or in an image. Furthermore, detecting faulty components in step E9 makes it possible to construct another image in which each failure is replaced by the real name of the component. These images may then easily be consulted by experts.

Thus, the present invention serves firstly to diagnose an anomaly and then to classify failures associated with that anomaly by using a method that is open and suitable for interpretation by engine experts.

Furthermore, decoupling the detection of an abnormality from the classification of failures enables new types of failure to be detected that are not listed by experts, enables them to be analyzed, and then enables them to be included in turn in the list of potential failures.

Furthermore, in a preferred implementation, the various steps of the method of the invention are executed by means of program code instructions.

Consequently, the invention also provides a computer program product, the program being capable of being implemented in the processor means or a computer system, the program including code instructions adapted to implementing a method of the invention as described above.

The program may use any programming language, and be in the form of source code, object code, or code intermediate between source code and object code, such as in a partially compiled form, or in any other desirable form.

The invention also provides a data medium readable by a computer and including computer program instructions as mentioned above.

The data medium may be any entity or device capable of storing the program. For example, the medium may comprise storage means such as a read-only memory (ROM), e.g. a compact disk (CD) ROM, or a microelectronic circuit ROM, or any other recording means.

Furthermore, the data medium may be a transmissible medium such as an electrical or optical signal, that may be conveyed via electrical or optical cable, by radio, or by other means.

Alternatively, the data medium may be an integrated circuit in which the program is incorporated, the circuit being adapted to execute or to be used in the execution of the method in question.

The invention claimed is:

1. A method of identifying failures in an aeroengine, the method comprising:
using sensors to collect time-series measurements from said aeroengine and its environment;
using a processor means to calculate from said time-series measurements indicators that are specific to elements of said aeroengine;
using the processor means to define from said specific indicators a set of standardized indicators that are representative of an operation of said aeroengine;
using the processor means to construct an anomaly vector representative of a behavior of said engine as a function of said set of standardized indicators;
using the processor means, in an event of an abnormality being revealed by said anomaly vector, to select a subset of reference vectors having directions belonging to a determined neighborhood of a direction of said anomaly vector, said subset of reference vectors being selected from a set of reference vectors associated with failures of said aeroengine and determined using criteria established by experts; and
using the processor means to identify the failures associated with said subset of reference vectors;
and wherein the selecting said subset of reference vectors comprises:
using the processor means to calculate geodesic distances between a projection of said anomaly vector and projections of said reference vectors on a sphere in a space of dimension equal to a number of indicators in said set of standardized indicators minus a number of linear relationships between the indicators;
using the processor means to compare said geodesic distances in pairs;
using the processor means to classify the reference vectors in increasing order of their geodesic distances relative to said anomaly vector; and
using the processor means to form said subset of reference vectors from first reference vectors having a classification order less than a determined rank.

2. A method according to claim 1, wherein said sphere is of radius 1.

3. A method according to claim 1, further comprising:
using the processor means to define, for each reference vector, an a priori probability of occurrence on the basis of criteria established by experts; and
using the processor means to calculate, for each reference vector, an a posteriori probability of occurrence as a function of said a priori probability of occurrence and of said geodesic distances.

4. A method according to claim 1, wherein said set of standardized indicators $\tilde{\tilde{y}}_1, \ldots \tilde{\tilde{y}}_m$ comprises indicators $\tilde{y}_1, \ldots \tilde{y}_n$ identified by the processor means using criteria established by experts.

5. A method according to claim 4, wherein said set of standardized indicators $\tilde{\tilde{y}}_1, \ldots \tilde{\tilde{y}}_m$ further comprises dynamic indicators constructed by the processor means as a function of the indicators at present and past instants $\tilde{\tilde{y}}(t)=f(\tilde{y}(s); s \leq t)$ and representative of the behavior of said aeroengine over time.

6. A method according to claim 1, wherein said constructing said anomaly vector comprises:
using the processor means to form an indicator vector $\tilde{\tilde{y}}$ from said set of indicators; and
using the processor means to construct said anomaly vector z by renormalizing said indicator vector $\tilde{\tilde{y}}$ using formula:

$$z = \Sigma^{-1/2}(\tilde{\tilde{y}} - \mu)$$

in which $\mu$ is the mean of the indicator vectors and $\Sigma^{-1/2}$ is the root of a pseudo-inverse signal $\Sigma^{-1}$ of a covariance matrix $\Sigma$.

7. A method according to claim 6, further comprising:
using the processor means to calculate the norm of said anomaly vector using a Mahalanobis distance:

$$d^2 = \|z\|^2 = (\tilde{\tilde{y}} - \mu)^T \Sigma^{-1}(\tilde{\tilde{y}} - \mu); \text{ and}$$

using the processor means to detect an abnormality of said aeroengine using a trigger threshold defined as a function of statistical distribution of said norm of the anomaly vector.

8. A method according to claim 1, wherein said set of reference vectors is constructed in accordance with caricatural behaviors of the indicators in the event of anomalies.

9. A method according to claim 3, further comprising:
using the processor means to establish a decision grid in application of criteria established by experts;
using the processor means to apply Bayesian rules to deduce per component probabilities of failures from said a posteriori probabilities of occurrence and from said decision grid; and
using the processor means to detect faulty physical components that are responsible for said failures in application of said per component failure probabilities.

10. A method according to claim 9, wherein said decision grid is formed of a matrix of conditional probabilities that a component is faulty, knowing that a failure has been observed and of a series of coefficients corresponding to a priori probabilities of failure of each component.

11. A method according to claim 9, wherein said decision grid is corroborated by machine learning.

12. A non-transitory computer readable medium including computer executable instructions for implementing the method of identifying failures according to claim 1, when executed by a processor.

13. A system for identifying failures in an aeroengine, the system comprising:
sensors for collecting time-series measurements from said aeroengine and its environment;
means for calculating from said time-series measurements indicators that are specific to elements of said aeroengine;
means for using said specific indicators to define a set of standardized indicators representative of an operation of said aeroengine;
means for constructing an anomaly vector representative of a behavior of said engine as a function of said set of standardized indicators;
means for selecting in an event of an anomaly being revealed by said anomaly vector a subset of reference vectors having directions belonging to a determined neighborhood of a direction of said anomaly vector, said subset of reference vectors being selected from a set of reference vectors associated with failures of said aeroengine and determined using criteria established by experts;
means for identifying the failures associated with said subset of reference vectors;
and wherein the means for selecting a subset of reference vectors comprises:
means for calculating geodesic distances between a projection of said anomaly vector and projections of said reference vectors on a sphere in a space of dimension equal to a number of indicators of said set of standardized indicators minus a number of linear relationships between said indicators;
means for comparing said geodesic distances in pairs;
means for classifying the reference vectors in an increasing order of their geodesic distances relative to said anomaly vector; and
means for forming said subset of reference vectors from first reference vectors having a classification order less than a determined rank.

14. A system according to claim 13, further comprising:
means for defining, for each reference vector, an a priori probability of occurrence in application of criteria established by experts; and
means for calculating, for each reference vector, an a posteriori probability of occurrence as a function of said a priori probability of occurrence and of said geodesic distances.

15. A system according to claim 13, further comprising:
means for establishing a decision grid in application of criteria established by experts;
means for using Bayesian rules to deduce per component failure probabilities from said a posteriori probabilities of occurrence and from said decision grid; and
means for detecting faulty physical components that are responsible for said failures according to said per component failure probabilities.

* * * * *